(12) United States Patent
Kakimura

(10) Patent No.: US 11,380,956 B2
(45) Date of Patent: Jul. 5, 2022

(54) ENERGY STORAGE APPARATUS

(71) Applicants: Blue Energy Co., Ltd., Kyoto (JP); Honda Motor Co., Ltd., Tokyo (JP)

(72) Inventor: Hiroaki Kakimura, Kyoto (JP)

(73) Assignees: BLUE ENERGY CO., LTD., Kyoto (JP); HONDA MOTOR CO., LTD., Tokyo (JP)

(*) Notice: Subject to any disclaimer, the term of this patent is extended or adjusted under 35 U.S.C. 154(b) by 104 days.

(21) Appl. No.: 16/130,113

(22) Filed: Sep. 13, 2018

(65) Prior Publication Data

US 2019/0088913 A1 Mar. 21, 2019

(30) Foreign Application Priority Data

Sep. 21, 2017 (JP) .............................. JP2017-181362

(51) Int. Cl.
*H01M 50/20* (2021.01)
*H01M 50/256* (2021.01)
*H01M 50/502* (2021.01)
*H01M 50/529* (2021.01)

(52) U.S. Cl.
CPC ......... *H01M 50/20* (2021.01); *H01M 50/256* (2021.01); *H01M 50/502* (2021.01); *H01M 50/529* (2021.01)

(58) Field of Classification Search
CPC ............. H01M 50/502; H01M 50/529; H01M 50/543; H01M 50/20; H01M 50/296; H01M 50/256
USPC ........................................................ 429/149
See application file for complete search history.

(56) References Cited

U.S. PATENT DOCUMENTS

| | | | |
|---|---|---|---|
| 2011/0294000 A1* | 12/2011 | Kim ..................... | H01M 50/20 |
| | | | 429/176 |
| 2013/0252047 A1* | 9/2013 | Park .................... | H01M 50/502 |
| | | | 429/90 |
| 2014/0099524 A1 | 4/2014 | Furuya et al. | |

(Continued)

FOREIGN PATENT DOCUMENTS

| | | | |
|---|---|---|---|
| JP | 2009-252499 A | 10/2009 | |
| JP | 2013-026059 A | 2/2013 | |

(Continued)

OTHER PUBLICATIONS

EPO machine translations of JP2017117574 originally published to Hoshino Motoki on Jun. 29, 2017 (Year: 2017).*

*Primary Examiner* — Cynthia H Kelly
*Assistant Examiner* — Niara Trant
(74) *Attorney, Agent, or Firm* — McGinn IP Law Group, PLLC

(57) ABSTRACT

Provided is an energy storage apparatus which can be brought into a state where outputting of electricity from an overall terminal cannot be performed. The energy storage apparatus includes: a plurality of energy storage devices; an overall electrode to which electricity is supplied from the plurality of energy storage devices; an overall terminal which is electrically terminated from the overall electrode and is electrically connected to the overall electrode by a conductive member; a cover member which is removable and covers the overall electrode; and a cover which openably and closably covers the overall electrode covered by the cover member.

20 Claims, 12 Drawing Sheets

(56) References Cited

U.S. PATENT DOCUMENTS

| | | | |
|---|---|---|---|
| 2014/0370341 A1* | 12/2014 | Oshiba | H01M 50/502 429/82 |
| 2016/0036021 A1* | 2/2016 | Hoshino | H01G 4/38 429/99 |
| 2016/0149177 A1 | 5/2016 | Sugeno et al. | |
| 2018/0175348 A1 | 6/2018 | Sugeno et al. | |
| 2019/0081292 A1* | 3/2019 | Shimizu | H01M 2/206 |

FOREIGN PATENT DOCUMENTS

| | | | | |
|---|---|---|---|---|
| JP | 2013-058466 A | | 3/2013 | |
| JP | 2013-120690 A | | 6/2013 | |
| JP | 2015-011956 A | | 1/2015 | |
| JP | 2015-032408 A | | 2/2015 | |
| JP | 2017117574 A | * | 6/2017 | H01M 50/20 |

* cited by examiner

FIG. 5
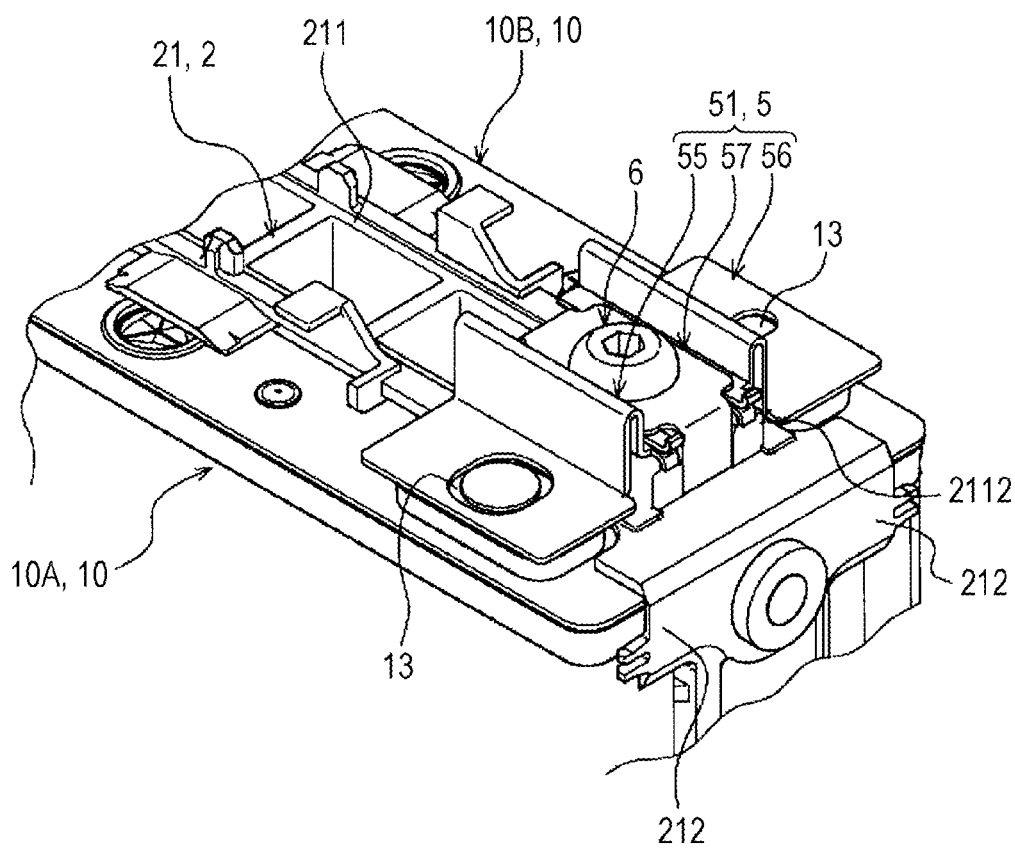
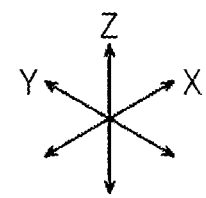

FIG. 7
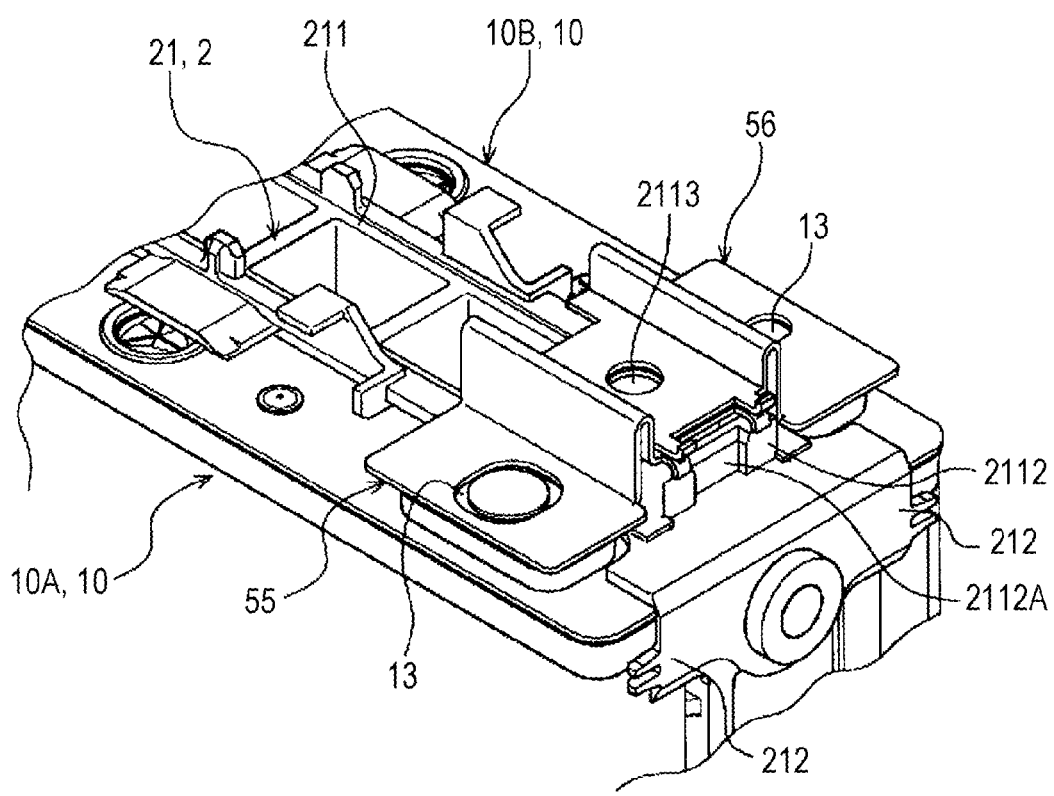
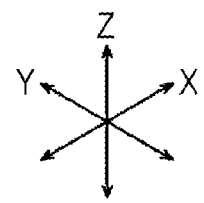

ENERGY STORAGE APPARATUS

CROSS-REFERENCE TO RELATED APPLICATIONS

This application is based on Japanese Patent Application No. 2017-181362, filed on Sep. 21, 2017, the entire contents of which are hereby incorporated by reference.

FIELD

The present invention relates to an energy storage apparatus which includes a plurality of energy storage devices.

BACKGROUND

Conventionally, there has been known an assembled battery which includes a plurality of battery cells (JP 2013-120690 A). To be more specific, the assembled battery includes: a plurality of battery cells each of which has electrode terminals formed of a positive electrode terminal and a negative electrode terminal, and a plurality of bus bars which connect electrode terminals such that all battery cells are connected in series.

In the assembled battery, an end portion of the bus bar to which the positive electrode terminal of the battery cell positioned on one end of a path through which electricity flows is connected corresponds to a positive electrode side terminal which forms an overall terminal of the whole assembled battery. On the other hand, an end portion of the bus bar to which the negative electrode terminal of the battery cell positioned on the other end of the path through which electricity flows is connected corresponds to a negative electrode side terminal which forms an overall terminal of the whole assembled battery.

In the above-mentioned assembled battery, the bus bars are connected (fixed) to the electrode terminals by laser welding or arc welding. Accordingly, the bus bar cannot be easily removed from the electrode terminal and hence, in the assembled battery, electricity can be constantly inputted to or outputted from the positive electrode side terminal (the overall terminal on a positive electrode side) and the negative electrode side terminal (the overall terminal on a negative electrode side).

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In the conventional energy storage apparatus, even in a case where outputting of electricity is unnecessary such as a case where the energy storage apparatus is mounted on an apparatus or the like on which the energy storage apparatus is to be installed or a case where the energy storage apparatus is transported, a state where electricity can be outputted from the overall terminals is maintained. It has been desired to enhance easiness of handling of the energy storage apparatus at the time of mounting the energy storage apparatus or the like on the apparatus or at the time of transporting the energy storage apparatus by bringing the energy storage apparatus into a state where electricity cannot be outputted from the overall terminals. In view of the above, it is an object of the present invention to provide an energy storage apparatus where easiness of handling of the energy storage apparatus at the time of mounting the energy storage apparatus or the like on an apparatus or the like or at the time of transporting the energy storage apparatus or the like is enhanced.

An energy storage apparatus according to an aspect of the present invention includes: a plurality of energy storage devices; an overall electrode to which electricity is supplied from the plurality of energy storage devices; an overall terminal which is electrically terminated from the overall electrode and is electrically connected to the overall electrode by a conductive member; a cover member which is removable and covers the overall electrode; and a cover which openably and closably covers the overall electrode covered by the cover member.

BRIEF DESCRIPTION OF DRAWINGS

The foregoing and other features of the present invention will become apparent from the following description and drawings of an illustrative embodiment of the invention in which:

FIG. 5 is an enlarged perspective view of a first bus bar and the surrounding of the first bus bar of the energy storage apparatus.

FIG. 7 is an enlarged perspective view of the first bus bar and the surrounding of the first bus bar in a state where a mounting member and a third member are removed.

DESCRIPTION OF EMBODIMENTS

Figure 1:
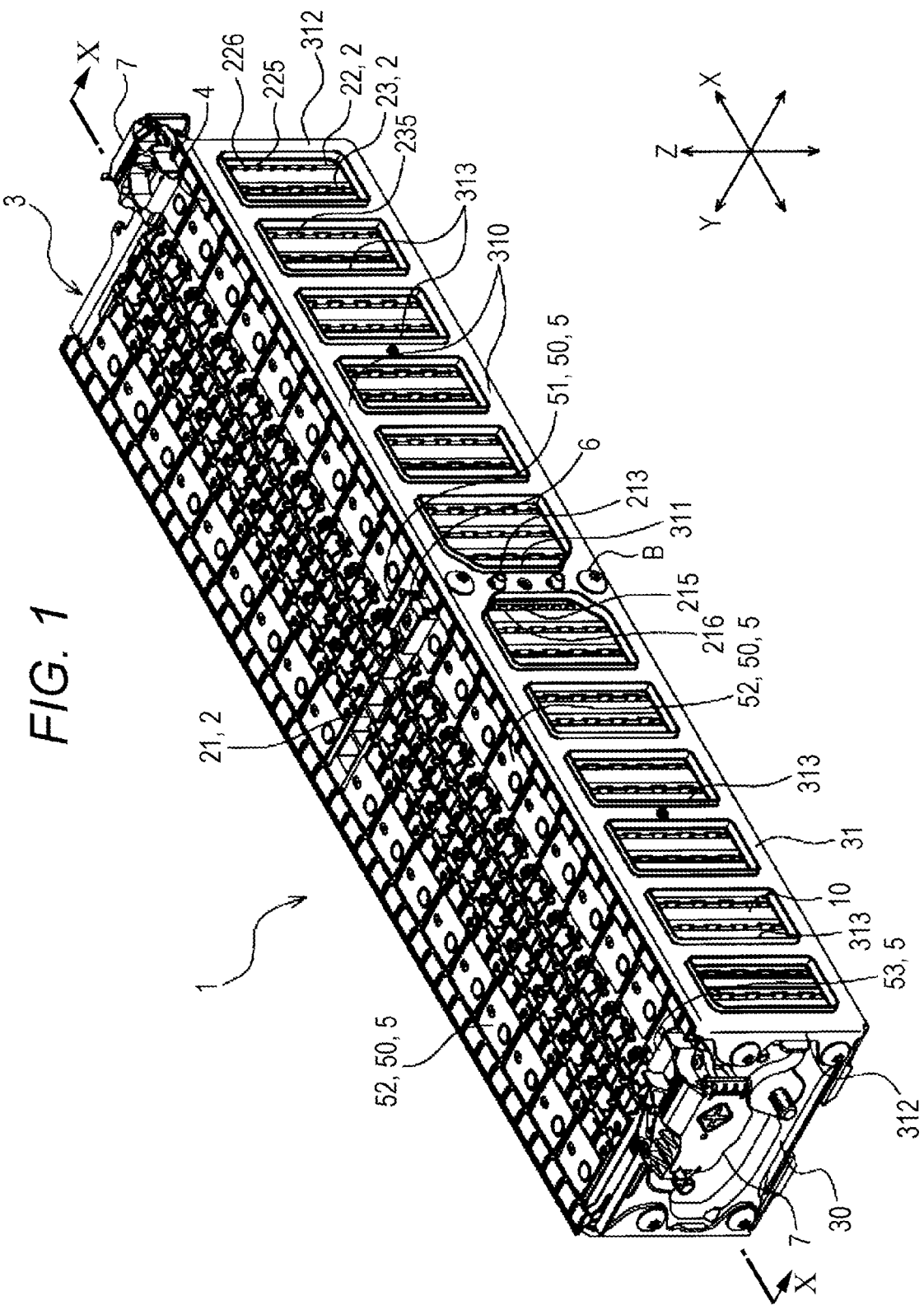
FIG. 1 is a perspective view of an energy storage apparatus according to an embodiment of the present invention.

An energy storage apparatus according to an aspect of the present invention includes: a plurality of energy storage devices; an overall electrode to which electricity is supplied from the plurality of energy storage devices; an overall terminal which is electrically terminated from the overall electrode and is electrically connected to the overall electrode by a conductive member; a cover member which is removable and covers the overall electrode; and a cover which openably and closably covers the overall electrode covered by the cover member.

The energy storage apparatus has the overall electrode which is electrically terminated from the overall electrode to which electricity is supplied from the plurality of energy storage devices, and which is electrically connected to the overall electrode by the conductive member. With such a configuration, it is possible to bring the energy storage apparatus into a state where electricity cannot be outputted from the overall terminal at the time of mounting the energy storage apparatus on an apparatus or the like or at the time of transporting the energy storage apparatus or the like. Further, in the energy storage apparatus, the overall electrode is covered by the cover member and hence, it is also possible to prevent the overall electrode and the overall terminal from being inadvertently electrically connected with each other. Still further, in the energy storage apparatus, the overall electrode is protected doubly by the cover member and the cover and hence, inadvertent outputting of electricity from the overall electrode also can be suppressed.

The energy storage apparatus may include a conductive member which is detachably mounted on the overall electrode and the overall terminal, and the energy storage apparatus may be switchable between a first state where the overall electrode and the overall terminal are electrically connected with each other by the conductive member and a second state where the overall electrode and the overall terminal are not electrically connected with each other.

The energy storage apparatus having such a configuration can be brought into a state where electricity cannot be outputted from the overall terminal even in a case where it is necessary to transport the energy storage apparatus again after transportation of the energy storage apparatus or mounting of the energy storage apparatus on an apparatus or the like is completed and the energy storage apparatus is brought into a state where electricity can be outputted from the overall terminal or in a case where it is necessary to mount the energy storage apparatus on another apparatus.

As has been described above, it is possible to provide an energy storage apparatus which can be brought into a state where electricity cannot be outputted from an overall terminal and hence, it is possible to provide an energy storage apparatus where easiness of handling at the time of mounting the energy storage apparatus on an apparatus or the like or at the time of transporting the energy storage apparatus or the like is enhanced.

Hereinafter, one embodiment of the present invention is described with reference to FIG. 1 to FIG. 12. Names of respective constitutional members (respective constitutional elements) of this embodiment are used only for this embodiment, and may differ from names of respective constitutional members (respective constitutional elements) used in BACKGROUND.

Figure 2:
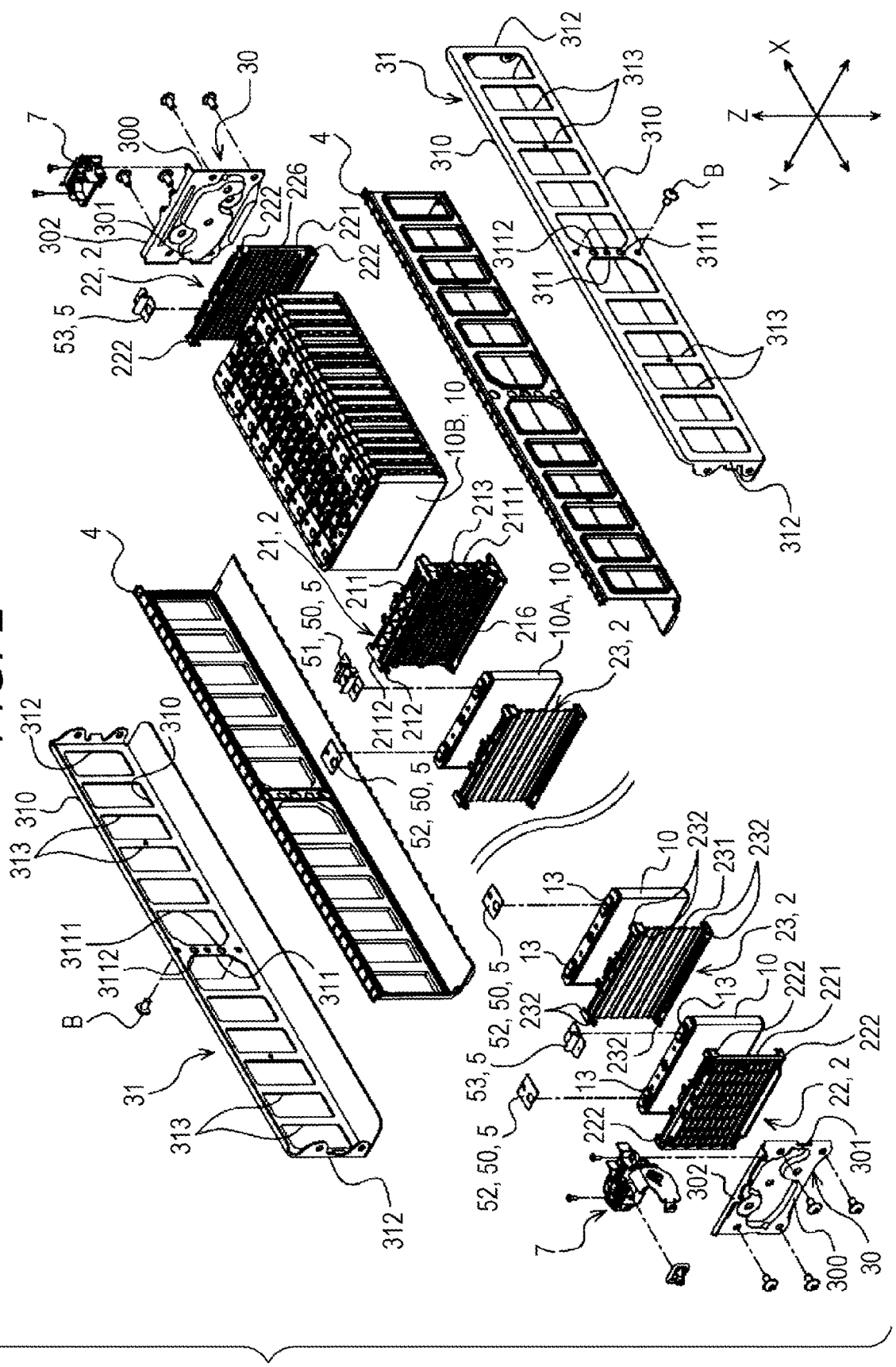
FIG. 2 is an exploded perspective view of the energy storage apparatus with a part omitted.

As shown in FIG. 1 and FIG. 2, the energy storage apparatus includes: a plurality of energy storage devices 10 each of which has external terminals 13 and which are arranged in parallel in a predetermined direction; and a plurality of bus bars 5 each of which makes the external terminals 13 of the different energy storage devices 10 conductive with each other. The energy storage apparatus 1 also includes: a plurality of neighboring members 2 each of which is disposed adjacently to the energy storage device 10, a holder 3 which collectively holds the plurality of energy storage devices 10 and the plurality of neighboring members 2; and insulators 4 which are disposed between the plurality of energy storage devices 10 and the holder 3. The energy storage apparatus 1 of this embodiment includes mounting member 6 each of which is detachably mounted on the neighboring member 2. Further, the energy storage apparatus 1 includes a pair of terminal bases 7 used for outputting and inputting of electricity to and from the outside.

Figure 3:
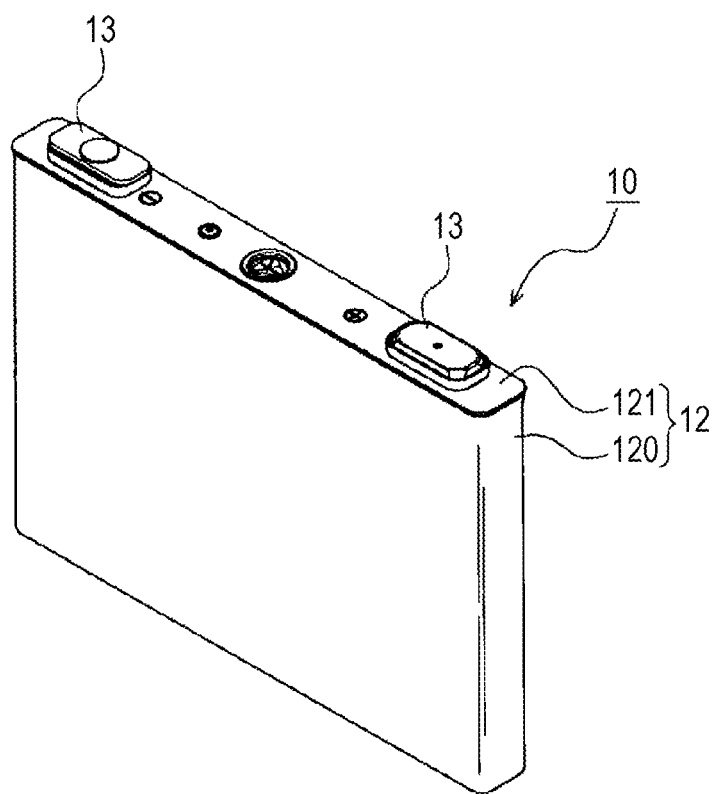
FIG. 3 is a perspective view of an energy storage device used for forming the energy storage apparatus.
Figure 4:
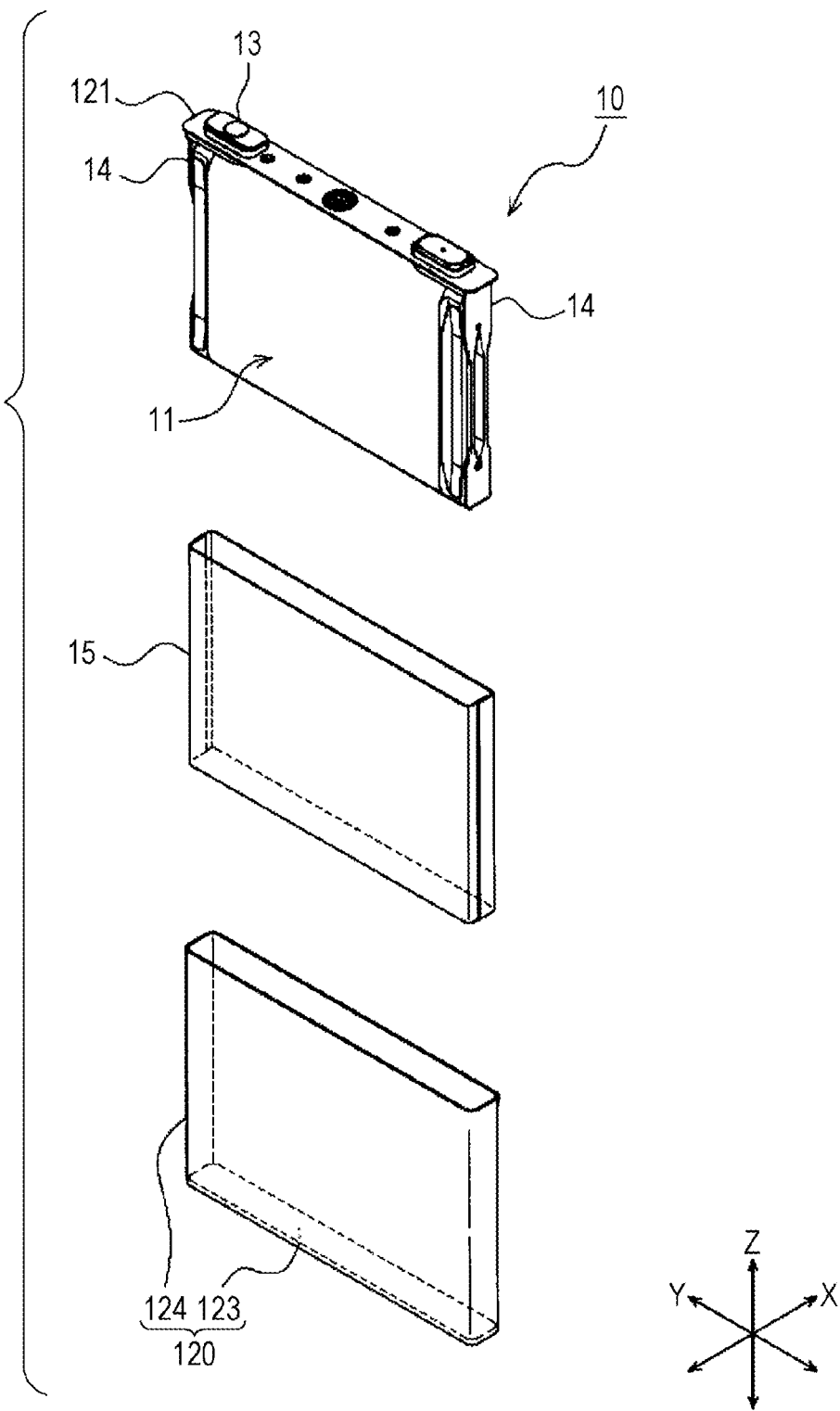
FIG. 4 is an exploded perspective view of the energy storage device.

As shown also in FIG. 3 and FIG. 4, each of the plurality of energy storage devices 10 includes: an electrode assembly 11 including positive electrodes and negative electrodes; a case 12 which accommodates the electrode assembly 11, and the pair of external terminals 13 which is disposed on an outer surface of the case 12.

The case 12 has: a case body 120 having an opening; and a lid plate 121 which closes the opening of the case body 120. The case 12 of this embodiment has a rectangular parallelepiped shape.

The case body 120 has: a rectangular-plate-like closing portion 123; and a cylindrical barrel portion 124 which is connected to a periphery of the closing portion 123. The barrel portion 124 has an angular cylindrical shape along a profile of the closing portion 123, that is, a flat angular cylindrical shape. One end of the barrel portion 124 is closed by the closing portion 123, and the other end of the barrel portion 124 is opened. That is, the case body 120 has a flat bottomed angular cylindrical shape.

The lid plate 121 is a plate-like member which closes the opening of the case body 120. To be more specific, the lid plate 121 has a profile corresponding to a peripheral portion of the opening of the case body 120 as viewed in a normal direction. In this embodiment, the pair of external terminals 13 is mounted on the lid plate 121 in a state where the pair of external terminals 13 is electrically connected to respective electrodes (positive electrodes and negative electrodes) of the electrode assembly 11. On the lid plate 121 of this embodiment, the pair of external terminals 13 is disposed in a spaced apart manner in a longitudinal direction of the rectangular-shaped lid plate 121.

The above-mentioned case 12 is configured such that, in a state where the electrode assembly 11 is accommodated in the case 12, a peripheral portion of the lid plate 121 is overlapped to a peripheral portion of the opening of the case body 120 so that the opening of the case body 120 is closed, and a boundary portion between the lid plate 121 and the case body 120 in such a state are welded to each other.

In the energy storage apparatus 1 of this embodiment, the plurality of energy storage devices 10 each having the above-mentioned configuration are arranged. To be more specific, the plurality of energy storage devices 10 are arranged parallel to each other so as to allow wide wall portions of the barrel portions 124 to opposely face each other. In the description made hereinafter, a direction that the energy storage devices 10 are arranged parallel to each other (a direction that the wide wall portions of the barrel portions 124 opposely face each other) is assumed as an X axis direction in orthogonal coordinates. A direction that narrow wall portions of the barrel portion 124 of the energy storage device 10 opposely face each other is assumed as a Y axis direction in the orthogonal coordinates, and a direction that the lid plate 121 and the closing portion 123 of the energy storage device 10 opposely face each other is assumed as a Z axis direction in the orthogonal coordinates. With such a configuration, axes of orthogonal coordinates corresponding to the X axis direction, the Y axis direction, and the Z axis direction are illustrated auxiliary in the respective drawings.

The neighboring member 2 is disposed between the energy storage devices 10 disposed adjacently to each other in the X axis direction or between the energy storage device 10 and a member which is disposed adjacently to the energy storage device 10 in the X axis direction (in an example of this embodiment, a part of the holder 3). As shown in FIG. 2, the energy storage apparatus 1 includes plural kinds of neighboring members. The neighboring member 2 of this embodiment includes: a first neighboring member (neighboring member) 21 which is disposed adjacently to the energy storage devices 10 disposed at a middle position of the energy storage apparatus 1 in the X axis direction, second neighboring members 22 each of which is disposed adjacently to the energy storage device 10 disposed at an outermost end out of which the plurality of energy storage devices 10 arranged parallel to each other in the X axis direction, and third neighboring members 23 each of which is disposed adjacently to the energy storage devices 10 disposed between the first neighboring member 21 and the second neighboring members 22.

The first neighboring member 21 is disposed between the energy storage devices 10 disposed adjacently to each other in the X axis direction. With such a configuration, a predetermined distance (creepage distance or the like) is ensured between the energy storage devices 10 arranged parallel to each other in the X axis direction with the first neighboring member 21 interposed therebetween. The first neighboring member 21 is connected (fixed) to the holder 3.

To be more specific, the first neighboring member 21 has: a body portion (hereinafter referred to as "first body portion") 211 which is disposed adjacently to the energy storage devices 10 (case bodies 120); and restricting portions (hereinafter referred to as "first restricting portions") 212 which restrict the movement of the energy storage devices 10 disposed adjacently to the first body portion 211 with respect to the first body portion 211. Further, the first neighboring member 21 has shaft portions 213 which are engaged with the holder 3.

The first body portion 211 has a rectangular profile corresponding to the neighboring energy storage devices 10 (cases 12) as viewed in an X axis direction. The first body portion 211 has connecting portions 2111 for fixing (connecting) the first neighboring member 21 to the holder 3, and a bus bar support portion 2112 for supporting the bus bar 5. Further, the first body portion 211 forms flow passages 215 which allow a cooling fluid (in the example of this embodiment, air) to pass therethrough between the first body portion 211 and the energy storage device 10 disposed adjacently to the first body portion 211 in the X axis direction. To be more specific, on the first body portion 211, a plurality of protruding portions 216 which protrude toward the neighboring energy storage device 10 (in the X axis direction) and extend in the Y axis direction are arranged in a spaced apart manner in the Z axis direction. With such a configuration, distal ends of the protruding portions 216 (distal ends in the protruding direction) are brought into contact with the neighboring energy storage device 10 thus forming the flow passages 215 between the first neighboring member 21 and the energy storage device 10. In the first neighboring member 21 of this embodiment, a size of the first body portion 211 in the X axis direction is larger than a size of a portion of the second neighboring member 22 and a size of a portion of the third neighboring member 23 corresponding to the first body portion 211 in the X axis direction.

The connecting portion 2111 is formed on end portions of the first body portion 211 in the Y axis direction respectively. The connecting portion 2111 of this embodiment is formed on both end portions of the first body portion 211 in the Y axis direction respectively. The connecting portion 2111 is a portion into which a bolt B is threadedly engaged in a state where the bolt B passes through the holder 3. In the energy storage apparatus 1, due to the threaded engagement of the bolts B with the connecting portions 2111, the first body portion 211 (first neighboring member 21) and the holder 3 are connected to each other. The connecting portions 2111 of this embodiment are respectively formed of a nut embedded in the end portion of the first body portion 211 in the Y axis direction.

Figure 6:
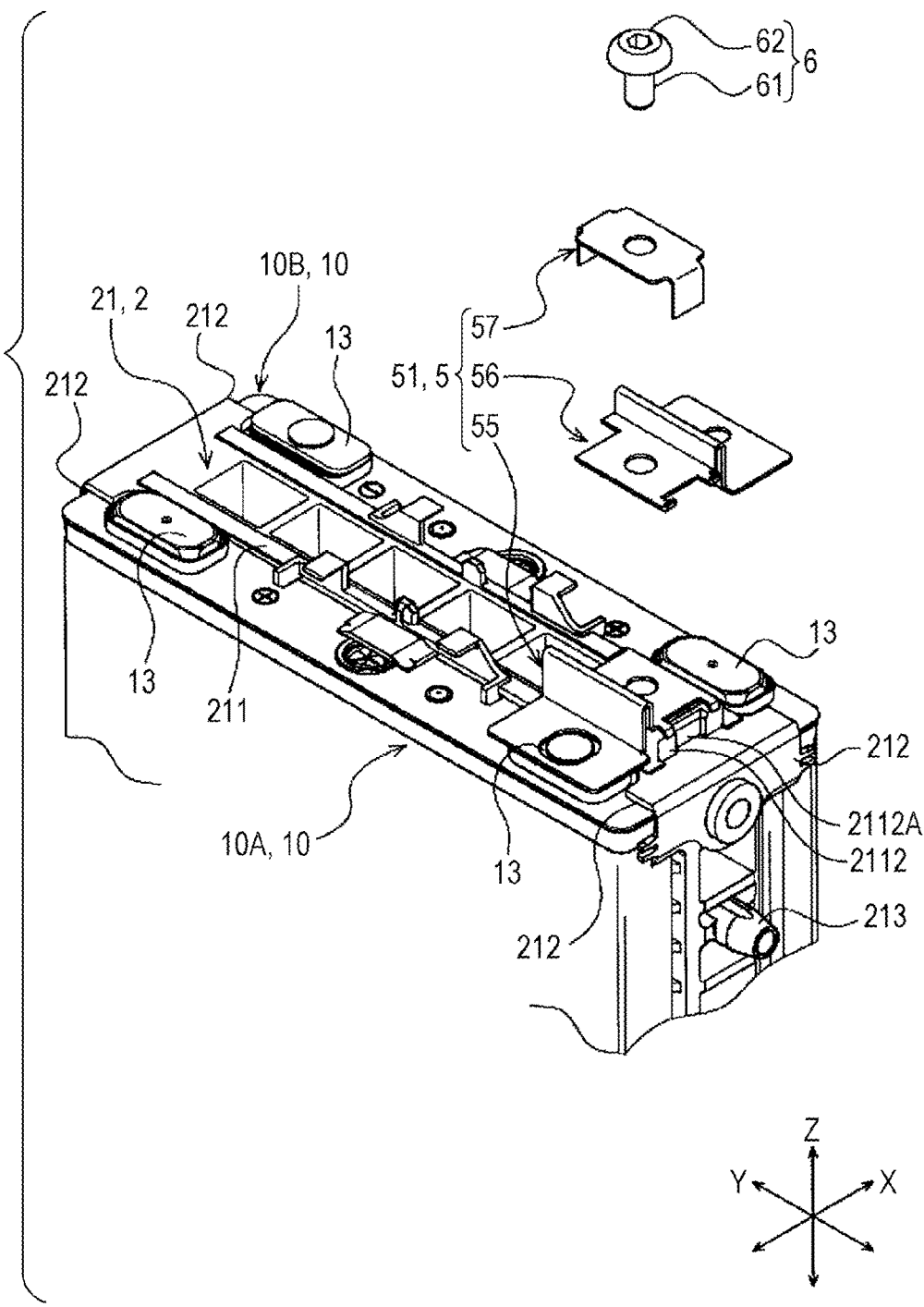
FIG. 6 is an exploded perspective view of the first bus bar and the surrounding of the first bus bar of the energy storage apparatus.

As shown also in FIG. 5 and FIG. 6, the bus bar support portion 2112 is formed on one end portion of the first body portion 211 in the Z axis direction (in the example of this embodiment, a side corresponding to the lid plate 121 of the energy storage device 10). The bus bar support portion 2112 is a portion partially protruding from one end surface of the first body portion 211. In this embodiment, the bus bar support portion 2112 is a rectangular-parallelepiped portion which is disposed at a position overlapping, in the Z axis direction, with the bus bar 5 which makes the external terminals 13 of the energy storage devices 10 disposed on both sides of the first neighboring member 21 conductive with each other. The bus bar support portion 2112 has a groove 2112A extending in the Z axis direction on both ends in the Y axis direction. The groove 2112A is brought into contact with a portion of the bus bar 5 extending in a state where the bus bar 5 straddles over the first neighboring member 21.

The bus bar support portion 2112 includes a fixing portion 2113 for fixing the bus bar 5. The fixing portion 2113 is a female threaded portion. To be more specific, the fixing portion 2113 is a female threaded portion which opens in the Z axis direction on an end surface of the bus bar support portion 2112 in a protruding direction. In this embodiment, the fixing portion 2113 is a nut.

The first restricting portions 212 extend in the X axis direction from the first body portion 211, and are brought into contact with the energy storage devices 10 (to be more specific, the cases 12) disposed adjacently to the first body portion 211 from the outside in the Y-Z plane (a plane including the Y axis direction and the Z axis direction) direction thus restricting the movement of the energy storage devices 10 in the Y-Z plane direction relative to the first body portion 211. The first restricting portion 212 has surfaces (contact surfaces) which extend in the X axis direction at least from the respective corner portions of the first body portion 211 and are brought into contact with corner portions of the energy storage device 10 (the case 12) disposed adjacently to the first body portion 211 from the outside in the Y-Z plane direction.

The shaft portions 213 extend outward from ends of the first body portion 211 in the Y axis direction, and are engaged with the holder 3. In this embodiment, the shaft portions 213 extend outward from both ends of the first body portion 211 in the Y axis direction respectively. To be more specific, the shaft portions 213 extend in the Y axis direction in a circular columnar shape from the end portions of the first body portion 211 in the Y axis direction at an intermediate position of the first body portion 211 in the Z axis direction, and are made to pass through through holes 3112 which are formed in portions of the holder 3 corresponding to the shaft portions 213. In this embodiment, the shaft portions 213 are used for positioning the first neighboring member 21 with respect to the holder 3 at the time of connecting (fixing) the first neighboring member 21 to the holder 3 in the manufacture of the energy storage device 1.

The second neighboring member 22 has an insulation property. As shown in FIG. 1 and FIG. 2, the second neighboring member 22 is disposed between the energy storage device 10 and the holder 3 in the X axis direction. With such a configuration, a predetermined distance (creepage distance or the like) can be ensured between the energy storage device 10 arranged parallel to each other in the X axis direction with the second neighboring member 22 interposed therebetween and the holder 3.

To be more specific, the second neighboring member 22 which is disposed between the energy storage device 10 and the holding member 3 has: a body portion (hereinafter referred to as "second body portion") 221 which is disposed adjacently to the energy storage device 10 (case body 120); and restricting portions (hereinafter referred to as "second restricting portion") 222 which restrict the movement of the energy storage device 10 disposed adjacently to the second body portion 221 with respect to the second body portion 221.

The second body portion 221 has a rectangular profile corresponding to the neighboring energy storage device 10 (case 12) as viewed in the X axis direction. The second body portion 221 forms flow passages 225 which allow a cooling fluid (in the example of this embodiment, air) to pass therethrough between the second body portion 221 and the energy storage device 10 disposed adjacently to the second body portion 221 in the X axis direction. To be more specific, in the second body portion 221, a plurality of protruding portions 226 which protrudes toward the neighboring energy storage device 10 (in the X axis direction) and extend in the Y axis direction are arranged in a spaced apart manner in the Z axis direction. With such a configuration, distal ends (distal ends in the protruding direction) of the protruding portions 226 are brought into contact with the neighboring energy storage device 10 thus forming the flow passages 225 between the second neighboring member 22 and the energy storage device 10.

The second restricting portions 222 extend in the X axis direction from the second body portion 221, and are brought into contact with the energy storage device 10 (to be more specific, the case 12) disposed adjacently to the second body portion 221 from the outside in the Y-Z plane direction thus restricting the movement of the energy storage device 10 in the Y-Z plane direction relative to the second body portion 221. The second restricting portions 222 have surfaces (contact surfaces) which extend in the X axis direction at least from respective corner portions of the second body portion 221 and are brought into contact with corner portions of the energy storage device 10 (the case 12) disposed adjacently to the second body portion 221 from the outside in the Y-Z plane direction.

The third neighboring members 23 are disposed between the first neighboring member 21 and the second neighboring members 22 and each third neighboring members 23 is disposed between the energy storage devices 10 which are disposed adjacently to each other in the X axis direction. With such a configuration, a predetermined distance (creepage distance or the like) can be ensured between the energy storage devices 10 arranged parallel to each other in the X axis direction with the third neighboring member 23 interposed therebetween.

To be more specific, the third neighboring member 23 has: a body portion (hereinafter referred to as "third body portion") 231 which is disposed adjacently to the energy storage device 10 (the case body 120); and restricting portions (hereinafter referred to as "third restricting portions") 232 which restrict the movement of the energy storage device 10 disposed adjacently to the third body portion 231 with respect to the third body portion 231.

The third body portion 231 has a rectangular profile corresponding to the energy storage device 10 (the case 12) disposed adjacently to the third body portion 231 as viewed in the X axis direction. The first body portion 211 forms flow passages 235 which allow a cooling fluid (in the example of this embodiment, air) to pass therethrough between the first body portion 211 and the energy storage devices 10 disposed adjacently to the first body portion 211 in the X axis direction. To be more specific, the third body portion 231 has a rectangular waveform cross-sectional shape. With such a configuration, the third body portion 231 is brought into contact with the energy storage devices 10 disposed adjacently to the third body portion 231 and hence, the flow passages 235 are formed between the third body portion 231 and the energy storage devices 10.

The third restricting portions 232 extend in the X axis direction from the third body portion 231, and are brought into contact with the energy storage device 10 (to be more specific, the case 12) disposed adjacently to the third body portion 231 from the outside in the Y-Z plane direction thus restricting the movement of the energy storage devices 10 in the Y-Z plane direction relative to the third body portion 231. The third restricting portions 232 have surfaces (contact surfaces) which extend in the X axis direction at least from respective corner portions of the third body portion 231 and are brought into contact with corner portions of the energy storage device 10 (the case 12) disposed adjacently to the third body portion 231 from the outside in the Y-Z plane direction.

The holder 3 surrounds the periphery of the plurality of energy storage devices 10 and the plurality of neighboring members 2 thus collectively holding the plurality of energy storage devices 10 and the plurality of neighboring members 2. The holder 3 is formed of members made of a material having conductivity. To be more specific, the holder 3 includes: a pair of terminal members 30 which is disposed such that the plurality of energy storage devices 10 are disposed between the pair of terminal members 30 in the X axis direction; and opposedly facing members 31 which connect the pair of terminal members 30 to each other in a state where the opposedly facing members 31 opposedly face the plurality of energy storage devices 10 in the Y axis direction. In the energy storage apparatus 1 of this embodiment, the pair of terminal members 30 is disposed such that each of the pair of terminal members 30 sandwiches the second neighboring member 22 with the energy storage device 10 disposed at an end in the X axis direction, and the pair of opposedly facing members 31 is disposed on both sides in the Y axis direction of a unit formed of the plurality of energy storage devices 10 arranged parallel to each other in the X axis direction.

Each of the pair of terminal members 30 expands in the Y-Z plane direction. To be more specific, each of the pair of terminal members 30 includes: a body 300 having a profile (in this embodiment, a rectangular profile) corresponding to the energy storage device 10; a pressure contact portion 301 which protrudes from the body 300 toward the second body portion 221 of the second neighboring member 22 and is brought into contact with the second neighboring member 22; and a support lug 302 on which the terminal base 7 is mounted. The support lug 302 is a plate-like member which extends in the X axis direction from a side corresponding to the lid plate 121 of the energy storage device 10 out of four sides (edges) which form a profile of the body 300 and is elongated in the Y axis direction.

The pair of opposedly facing members 31 respectively include: a pair of beam portions 310 which extends in the X axis direction and is disposed in a spaced apart manner from each other in the Z axis direction; a first connecting portion 311 which connects the pair of beam portions 310 to each other at an intermediate position in the X axis direction (in the example of this embodiment, a position overlapping with the first neighboring member 21 in the Y axis direction); and a pair of second connecting portions 312 which connects end portions of the pair of beam portions 310 to each other. The opposedly facing member 31 of this embodiment also includes third connecting portions 313 which connect the pair of beam portions 310 to each other between the first connecting portion 311 and the second connecting portions 312.

Each of the pair of beam portions 310 extends along corner portions of the plurality of energy storage devices 10 (the cases 12) arranged parallel to each other in the X axis direction. The first connecting portion 311 extends in the Z axis direction, and has through holes 3111, 3112 at positions corresponding to the connecting portion 2111 and the shaft portion 213 of the first neighboring member 21 (to be more specific, positions overlapping with the connecting portion 2111 and the shaft portion 213 in the Y axis direction). A bolt B is made to pass through the through hole 3111, and the bolt B is threadedly engaged with the connecting portion 2111 of the first neighboring member 21. With such a configuration, the opposedly facing member 31 and the first neighboring member 21 are connected to each other. Further, the shaft portion 213 of the first neighboring member 21 is made to pass through the through hole 3112. The second connecting portions 312 extend in the Z axis direction, and are connected to the terminal members 30. With such a configuration, the terminal members 30 and the opposedly facing members 31 are connected (joined) to each other. The third connecting portions 313 extend in the Z axis direction, and are disposed at positions overlapping with the energy storage devices 10 in the Y axis direction.

The insulators 4 have an insulation property. The insulators 4 are respectively disposed between the opposedly facing members 31 and the plurality of energy storage devices 10 arranged parallel to each other in the X axis direction. To be more specific, the insulator 4 covers at least a region of the holder 3 which opposedly faces the plurality of energy storage devices 10. With such a configuration, the insulator 4 provides insulation between the opposedly facing member 31 and the plurality of energy storage devices 10 arranged parallel to each other in the X axis direction.

The bus bars 5 are respectively formed of a plate-like member made of a material having conductivity such as metal. The bus bars 5 include plural kinds of bus bars. The bus bar 5 of this embodiment includes intermediate bus bars 50, and end portion bus bars 53.

The intermediate bus bar 50 electrically connects the external terminals 13 of the energy storage devices 10 to each other. The plurality of intermediate bus bars 50 are provided in the energy storage apparatus 1 (the number of intermediate bus bars 50 corresponding to the number of the plurality of energy storage devices 10). The plurality of intermediate bus bars 50 connect all of the plurality of energy storage devices 10 included in the energy storage apparatus 1 in series (make all of the plurality of energy storage devices 10 conductive with each other). Further, the plurality of intermediate bus bars 50 include: first bus bars 51 which make the external terminals 13 of the energy storage devices 10 disposed adjacently to each other conductive with each other with the first neighboring member 21 interposed therebetween (that is, connects the external terminals 13 in a state where the first bus bar 51 straddles over the first neighboring member 21), and second bus bars 52 each of which makes the external terminals 13 of the energy storage devices 10 disposed adjacently to each other conductive with each other with the third neighboring member 23 interposed therebetween (that is, connects the external terminals 13 to each other in a state where the second bus bar 52 straddles over the third neighboring member 23. The energy storage apparatus 1 of this embodiment includes one first bus bar 51, the plurality of second bus bars 52, and a pair of end portion bus bars 53.

As shown also in FIG. 5 and FIG. 6, the first bus bar 51 makes the external terminal 13 of a predetermined energy storage device 10 out of the plurality of energy storage devices 10 (hereinafter also referred to as "first energy storage devices 10A") and the external terminal 13 of another energy storage device 10 out of the plurality of energy storage devices 10 (hereinafter also referred to as "second energy storage device 10B") conductive with each other. In the example of this embodiment, the first energy storage device 10A is an energy storage device which is disposed adjacently to the first neighboring member 21 on one side (left side in FIG. 5) in the X axis direction, and the second energy storage device 10B is an energy storage device which is disposed adjacently to the first neighboring member 21 on the other side (right side in FIG. 5) in the X axis direction. That is, the first bus bar 51 connects the external terminals 13 of the energy storage devices 10A, 10B disposed adjacently to each other with the first neighboring member 21 interposed therebetween. The first bus bar 51 connects the external terminal 13 of the first energy storage device 10A and the external terminal 13 of the second energy storage device 10B to each other such that the first bus bar 51 straddles over the first neighboring member 21 in a state where a gap is formed between the first bus bar 51 and the first neighboring member 21 (that is, the first bus bar 51 is not brought into contact with the first neighboring member 21). The specific numbers of the first energy storage devices 10A and the second energy storage devices 10B which are made conductive with each other (connected to each other) by the first bus bars 51 are not limited.

The first bus bar 51 includes: a first member 55 which is connected to the external terminal 13 of the first energy storage device 10A; and a second member 56 which is connected to the external terminal 13 of the second energy storage device 10B and has a portion which overlaps with the first member 55. The first bus bar 51 of this embodiment also has a third member 57 which overlaps with the first member 55 and the second member 56.

Figure 8:
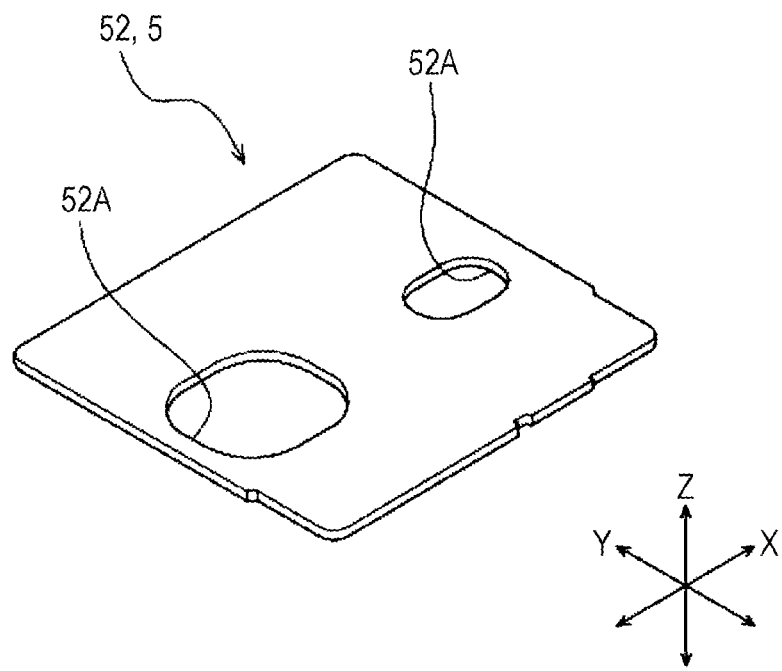
FIG. 8 is a perspective view of a second bus bar.

As shown in FIG. 1, FIG. 2, and FIG. 8, the second bus bar 52 is an approximately rectangular-shaped plate-like member extending in the X axis direction (to be more specific, expanding in the X-Y plane direction), and has two through holes 52A at both ends thereof in the X axis direction. Sizes of these two through holes 52A differ from each other. In the energy storage apparatus 1 of this embodiment, a portion (end portion) of the second bus bar 52 in which the larger through hole 52A is formed is connected to the external terminal 13 which forms the negative electrode, and a portion (end portion) where the smaller through hole 52A is formed is connected to the external terminal 13 which forms the positive electrode.

Figure 9:
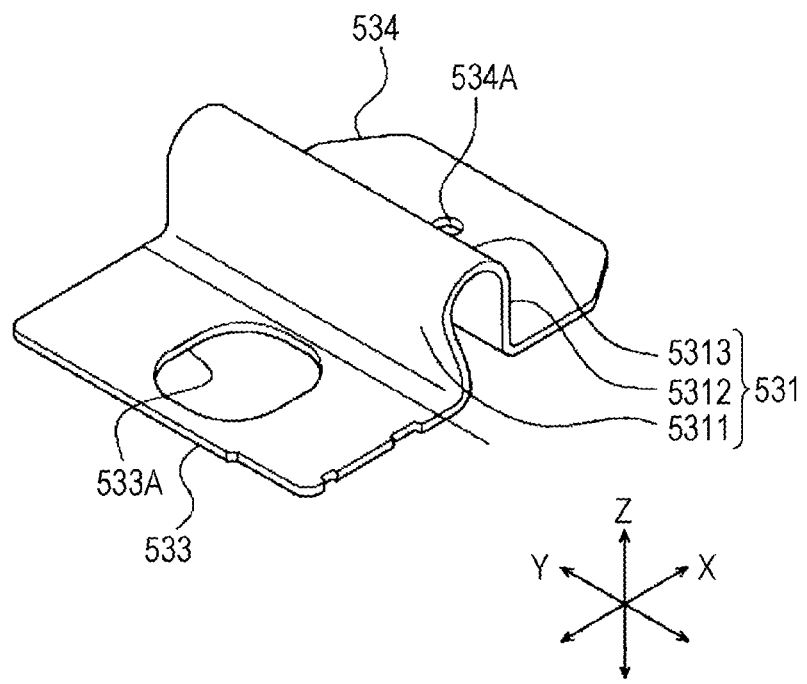
FIG. 9 is a perspective view of an end portion bus bar.

As shown in FIG. 1, FIG. 2 and FIG. 9, each of the pair of end portion bus bars 53 makes one terminal base 7 and the external terminal 13 of the energy storage device 10 disposed on one-electrode-side (for example, positive-electrode-side) end portion of a unit formed of the plurality of energy storage devices 10 connected to each other in series conductive with each other and, at the same time, makes the other terminal base 7 and the external terminal 13 of the energy storage device 10 disposed on the other-electrode-side (for example, negative-electrode-side) end portion of the unit formed of the plurality of energy storage devices 10 connected to each other in series conductive with each other.

The end portion bus bar 53 of this embodiment is a plate-like member extending in the X axis direction, and has a bent portion at an intermediate position thereof in the X axis direction. To be more specific, the end portion bus bar 53 has a third bypassing portion 531 which extends in a routing manner as viewed in the Y axis direction. To be more specific, the end portion bus bar 53 has: a third connecting portion 533 which is connected to the terminal base 7; a fourth connecting portion 534 which is connected to the external terminal 13 of the energy storage device 10; and the third bypassing portion 531 which connects the third connecting portion 533 and the fourth connecting portion 534 to each other. The third connecting portion 533 and the fourth connecting portion 534 are formed of a rectangular-plate-like portion expanding in the X-Y plane direction. The third connecting portion 533 has a through hole 533A, and the fourth connecting portion 534 has a through hole 534A. The through holes 533A, 534A differ from each other in size. The configuration of the third bypassing portion 531 of this embodiment is substantially equal to the configuration of a first bypassing portion 554 and the configuration of a second bypassing portion 564 of the first bus bar 51. That is, the third bypassing portion 531 has: a third raised portion 5311 which is raised (extends in the Z axis direction) from an end of the third connecting portion 533; a fourth raised portion 5312 which is raised (extends in the Z axis direction) from an end of the fourth connecting portion 534 in a spaced apart manner from the third raised portion 5311 in the X axis direction; and a curved portion 5313 which connects a distal end of the third raised portion 5311 and a distal end of the fourth raised portion 5312 to each other and has an arcuate shape as viewed in the Y axis direction.

The mounting member 6 is detachably mounted on the first neighboring member 21. To be more specific, as shown in FIG. 5 and FIG. 6, the mounting member 6 has a male threaded portion 61 which is threadedly engaged with the fixing portion (female threaded portion) 2113 of the first neighboring member 21 in a state where the male threaded portion 61 passes through the first member 55, the second member 56, and the third member 57 which are overlapped to each other in the Z axis direction from a third member 57 side.

The mounting member 6 of this embodiment is a bolt, and has a male threaded portion 61 extending in the Z axis direction and a head portion 62 which is formed on an end portion of the male threaded portion 61 and has a larger size in the X-Y plane direction than the male threaded portion 61. Further, the male threaded portion 61 is threadedly engaged with the fixing portion 2113 of the bus bar support portion 2112 in a state where the male threaded portion 61 passes through the first member 55, the second member 56, and the third member 57 and hence, the head portion 62 presses the first member 55, the second member 56, and the third member 57 toward the bus bar support portion 2112.

Figure 10:
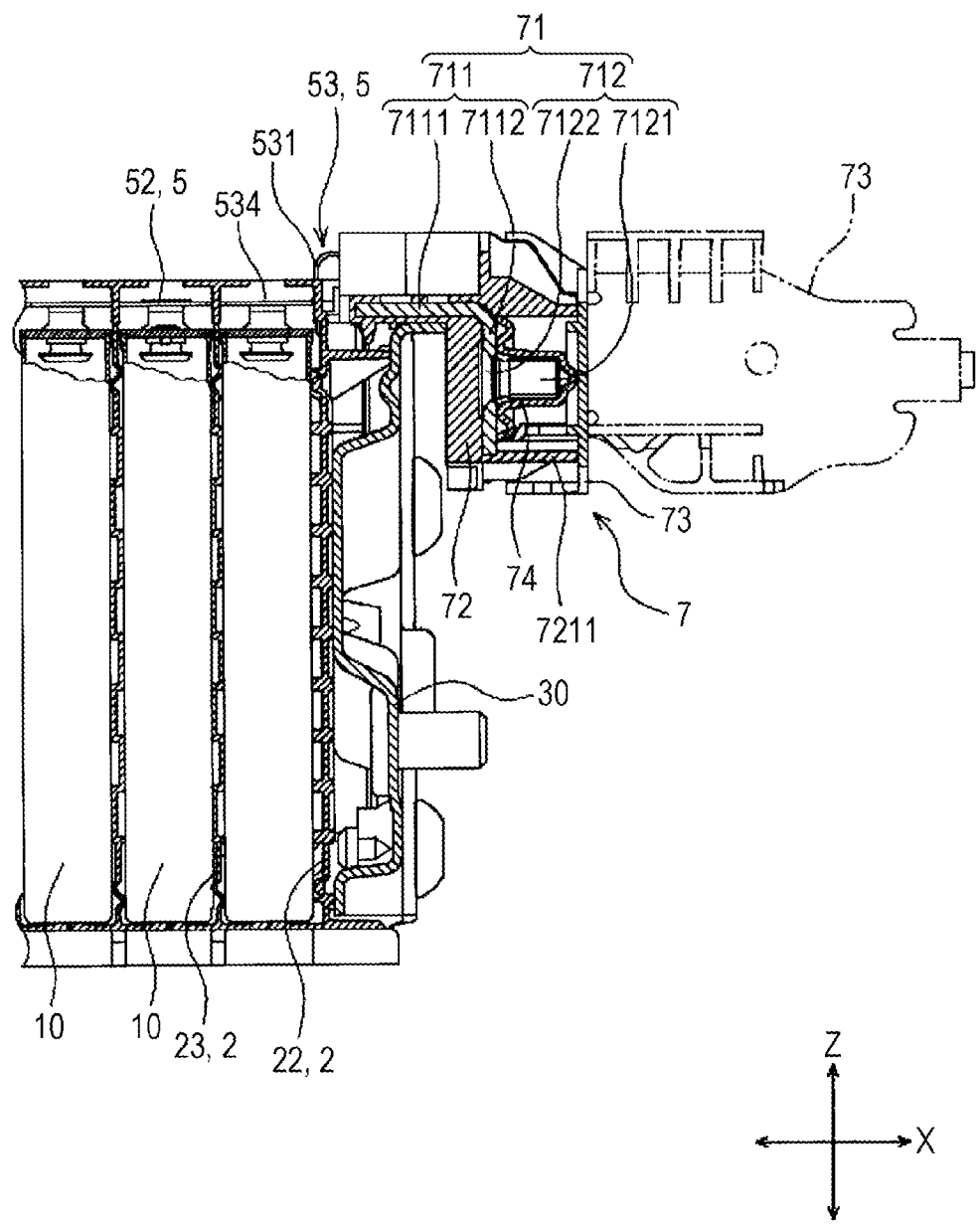
FIG. 10 is a cross-sectional view of a terminal base and the surrounding of the terminal base taken along a position X-X in FIG. 1.

As shown in FIG. 1, FIG. 2 and FIG. 10, the terminal base 7 includes: an overall terminal 70 which is connected to an external equipment, another energy storage apparatus 1 or the like; and an overall electrode 71 which relays electricity between the end portion bus bar 53 and the overall terminal 70 at the time of outputting or inputting electricity from or to the overall terminal 70. The terminal base 7 has a base portion 72 which is mounted on the holder 3 and supports the overall terminal 70 and the overall electrode 71. In the terminal base 7 of this embodiment, the overall electrode 71 and the overall terminal 70 are electrically terminated from each other such that electricity is not outputted from the overall terminal 70 when the energy storage apparatus 1 is not used or the like. On the other hand, the overall electrode 71 is electrically connected to the end portion bus bar 53. The terminal base 7 also includes a post-assembling bus bar 75 which forms a conductive member for electrically connecting the overall terminal 70 and the overall electrode 71 to each other at the time of using the energy storage apparatus 1. The terminal base 7 also includes: a cover member 74 which is removable and covers the overall electrode 71; and a cover 73 which openably and closably covers the overall electrode 71 which is covered by the cover member 74.

The overall electrode 71 is disposed between the energy storage device 10 which is positioned at an outermost end in an electricity flow path between the pair of overall terminals 70 and the overall terminal 70. The overall electrode 71 relays electricity outputted from the energy storage devices 10 and transmitting electricity to the overall terminal 70 through the post-assembling bus bar 75. The overall electrode 71 includes: a plate-like member 711 to which the end portion bus bar 53 is connected (fixed), and; a threaded member 712 which is used for fixing the post-assembling bus bar 75. The plate-like member 711 has conductivity. The plate-like member 711 of this embodiment is a member having an L shape as viewed in the Y axis direction, that is, is a plate-like member which is bent at an intermediate position thereof. To be more specific, the plate-like member 711 has a first portion 7111 which extends in a predetermined direction (in the example of this embodiment, in the X axis direction) and is fixed to the terminal member 30 by way of the base portion 72; and a second portion 7112 which extends in a direction intersecting with the predetermined direction (in the example of this embodiment, in the Z axis direction) from the first portion 7111.

The threaded member 712 has a shape similar to the overall terminal 70, and is disposed adjacently to the overall terminal 70 in a spaced apart manner in the Y axis direction. The threaded member 712 protrudes from the plate-like member 711 (in the example of this embodiment, the second portion 7112). To be more specific, the threaded member 712 has a male threaded portion 7121 which extends from the second portion 7112 in the X axis direction, and a head portion 7122 which expands in the Y-Z plane direction at one end of the male threaded portion 7121.

The base portion 72 is fixed to the terminal member 30, and supports the plate-like member 711 on a side where the terminal member 30 is positioned with respect to the plate-like member 711. The base portion 72 has side wall portions 721 which opposedly face each other such that the male threaded portion 7121 (threaded member 712) which penetrates the second portion 7112 of the plate-like member 711 and the overall terminal 70 are positioned between the side wall portions 721.

The side wall portions 721 include: first side wall portions 7211 which opposedly face each other in the Z axis direction such that only the male threaded portion 7121 is positioned between the first side wall portions 7211; and second side wall portions 7212 which opposedly face each other in the Y axis direction such that the male threaded portion 7121 and the overall terminal 70 are positioned between the second side wall portions 7212. The first side wall portions 7211 which opposedly face each other in the Z axis direction are disposed in an extending manner from both ends of one of the second side wall portions 7212 which opposedly face each other in the Y axis direction toward the other of the second side wall portions 7212. That is, one of the second side wall portions 7212 and the first side wall portions 7211 form a C shape as viewed in the X axis direction thus surrounding the male threaded portion 7121 from three sides. The overall terminal 70 is covered by the other of the second side wall portions 7212 which opposedly faces one of the second side wall portions 7212 in the Y axis direction. However, the overall terminal 70 is not covered by the side wall portion 721 in the Z axis direction and is in an open state.

On the second side wall portion 7212 disposed on an overall terminal 70 side, the cover 73 is mounted in a rotatable manner about a predetermined axis extending in the Z axis direction on a distal end portion of the second side wall portion 7212 in the X axis direction. In a state where the cover 73 is closed (in a state where the cover 73 is extended between edges of the second side wall portions 7212), the second portion 7112 of the plate-like member 711, the threaded portion 712, and the overall terminal 70 are covered by the cover 73 from the outside in the X axis direction. On the other hand, in a state where the cover 73 is opened (in a state where the cover 73 is rotated about the predetermined axis, see FIG. 2 and a double-dashed chain line in FIG. 10), the threaded member 712 and a distal end side of the overall terminal 70 are in an open state. Also in a state where the male threaded portion 7121 and the overall terminal 70 are covered by the cover 73 in the X axis direction, with respect to the Z axis direction of the overall terminal 70, the above-mentioned open state is maintained. The opened portion is used as a path for cables or the like for taking out electricity from the energy storage apparatus 1. In this embodiment, the cover 73 is configured to cover the overall terminal 70 and the overall electrode 71 in a state where the overall terminal 70 and the overall electrode 71 are electrically connected with each other by the post-assembling bus bar 75. With such a configuration, the energy storage apparatus 1 of this embodiment can protect the overall terminal 70 in a state where the overall terminal 70 can output electricity by the cover 73. The cover 73 and the base portion 72 of this embodiment are made of an insulating material such as a plastic.

In the energy storage apparatus 1 of this embodiment, the threaded member 712 is covered by the cover member 74 which is made of an elastically deformable insulating material such as rubber or plastic. The cover member 74 has a bottomed-cylindrical cap portion 741 which is fitted on the threaded member 712. A depth of the cap portion 741 from an opening portion which forms an insertion port of the threaded member 712 is larger than a protruding height of the threaded member 712 from the plate-like member 711. That is, the cap portion 741 is configured to cover the male threaded portion 7121 substantially over the whole length of the male threaded portion 7121.

The cover member 74 further includes a flange portion 742 which extends outward from an opening edge of the cap portion 741. The flange portion 742 has a flat plate shape. The cap portion 741 is positioned at a center portion of the flange portion 742, and protrudes from one surface side of the flange portion 742. A profile shape of the flange portion 742 corresponds to an inner shape of the side wall portions 721 which surround the male threaded portion 7121 in a C-shape, and is slightly larger than the inner shape of the side wall portions 721. That is, the cover member 74 is configured such that, when the male threaded portion 7121 is covered by the cap portion 741, the flange portion 742 covers the plate-like member 711, and an outer periphery of the flange portion 742 is brought into contact with the side wall portions 721 from the inside of the side wall portions 721. In this embodiment, the flange portion 742 includes a bent portion 7421 which bulges toward a side where the cap portion 741 protrudes on an outer peripheral portion of the flange portion 742. The bent portion 7421 forms a groove which goes around along the outer peripheral portion of the flange portion 742 when the bent portion 7421 is viewed from a side opposite to a side where the cap portion 741 protrudes. The flange portion 742 is elastically deformed such that a width of the groove is narrowed when the overall electrode 71 is covered by the cover member 74 so that the flange portion 742 is engaged with the side wall portions 721 due to an elastic restoring force.

The cap portion 741 may be configured to be divided into a proximal end side and a distal end side in the protruding direction from the flange portion 742. By forming the cap portion 741 such that a portion of the cap portion 741 is dividable, the distal end portion of the male threaded portion 7121 can be exposed while the overall electrode 71 is covered by the remaining portion of the cover member 74, and the overall terminal 70 and the overall electrode 71 can be made conductive with each other in such a state. To make a portion of the cap portion 741 on a distal end side dividable, for example, it is sufficient to form slits in the cap portion 741 along a circumferential direction of the cap portion 741 such that the cap portion 741 can be cut by pulling the distal end portion of the cap portion 741 with a hand. That is, in the cover member 74 of this embodiment, a full cut in which a portion of the cover member 74 in a direction going around the cap portion 741 is remained uncut or a half cut in which the half cut extends over the whole circumference of the cap portion 741 may be formed. In forming the full cut in which a portion of the cover member 74 in a direction going around the cap portion 741 is remained uncut, by forming the cap portion 741 using a raw material excellent in elastic deformability such as rubber, the distal end portion of the male threaded portion 7121 can be exposed by removing the distal end portion of the cap portion 741 without cutting the uncut portion. When the cap portion 741 is made of a raw material excellent in elastic deformability such as rubber, a cut for exposing the male threaded portion 7121 in a state where the male threaded portion 7121 is covered by the cover member 74 may be formed along a protruding direction of the cap portion 741.

In the energy storage apparatus 1 of this embodiment, in a state where the cover 73 is opened when the terminal base 7 is viewed in the X axis direction, although the overall terminal 70 is exposed, the overall terminal 70 is electrically terminated from the overall electrode 71. Accordingly, even when the cover 73 is opened at the time of mounting the energy storage apparatus 1 on another apparatus or at the time of transporting the energy storage apparatus 1, outputting of electricity stored in the energy storage device 10 from the overall terminal 70 can be suppressed. Further, in the energy storage apparatus 1 of this embodiment, also in a state where the cover 73 is opened, the overall electrode 71 is covered by the cover member 74. That is, in a state where the cover 73 is opened, the threaded member 712 is covered by the cap portion 741, and the plate-like member 711 is covered by the flange portion 742. Accordingly, even when the overall electrode 71 is electrically connected to the energy storage device 10, outputting of electricity stored in the energy storage device 10 from the overall electrode 71 can be suppressed.

In the energy storage apparatus 1 of this embodiment, the cover member 74 is removed from the overall electrode 71 by opening the cover 73, and the overall terminal 70 and the overall electrode 71 are electrically connected with each other by the post-assembling bus bar 75 and hence, outputting of electricity from the overall terminal 70 can be realized. The post-assembling bus bar 75 is a metal plate having a length longer than a distance between the overall terminal 70 and the overall electrode 71. The post-assembling bus bar 75 has a through hole which allows the overall terminal 70 to pass therethrough on one end portion thereof in a longitudinal direction, and has a through hole which allows the threaded member 712 of the overall electrode 71 to pass therethrough on one end portion thereof in the longitudinal direction. Accordingly, the post-assembling bus bar 75 can be fixed to the threaded member 712 and the overall terminal 70 using nuts or the like, and can be detachably mounted on both of the threaded member 712 and the overall terminal 70. The energy storage apparatus 1 of this embodiment may not include the post-assembling bus bar 75. In the energy storage apparatus 1 of this embodiment, the overall terminal 70 and the overall electrode 71 may be electrically connected with each other using a conductive member other than the post-assembling bus bar 75.

In the energy storage apparatus 1 of this embodiment, the post-assembling bus bar 75 is detachably mounted and hence, the energy storage apparatus 1 is switchable between a first state where the overall terminal 70 and the overall electrode 71 are electrically connected with each other and a second state where the overall terminal 70 and the overall electrode 71 are not electrically connected with each other. Accordingly, the energy storage apparatus 1 can be switched to a state where the outputting of electricity from the overall terminal 70 cannot be performed again after being brought into a state where electricity can be outputted from the overall terminal 70 once. In such a case, by mounting the cover member 74 on the overall electrode 71 again, outputting of electricity from the overall electrode 71 when the cover 73 is opened can be suppressed. In the energy storage apparatus 1, the post-assembling bus bar 75 and the cover member 74 can be selectively mounted on the overall electrode 71 and hence, the energy storage apparatus 1 can be easily handled also when it is necessary to transport the energy storage apparatus 1 by removing the energy storage apparatus 1 from another apparatus or the like after the energy storage apparatus 1 is electrically connected to another apparatus or the like.

In the energy storage apparatus 1 of this embodiment, the positive electrode-side terminal base 7 and the negative electrode-side terminal base 7 may respectively include the overall terminal 70 which is electrically terminated from the overall electrode 71, or only one of the positive electrode-side terminal base 7 and the negative electrode-side terminal base 7 may include the overall terminal 70 which is electrically terminated from the overall electrode 71. That is, in either one of the pair of terminal bases 7, the plurality of energy storage devices 10 and the overall terminal may be constantly electrically connected with each other. Further, the energy storage apparatus 1 of this embodiment may be configured such that the electrical connection is terminated before the overall electrode.

In the energy storage apparatus 1, an insulation plate (insulating member) may be mounted on the energy storage apparatus 1 such that inputting and outputting of electricity into and from the overall terminal 70 cannot be performed when inputting and outputting of electricity is unnecessary, that is, at the time of transporting the energy storage apparatus 1, at the time of performing maintenance of an equipment on which the energy storage apparatus 1 is mounted, or the like.

Figure 11:
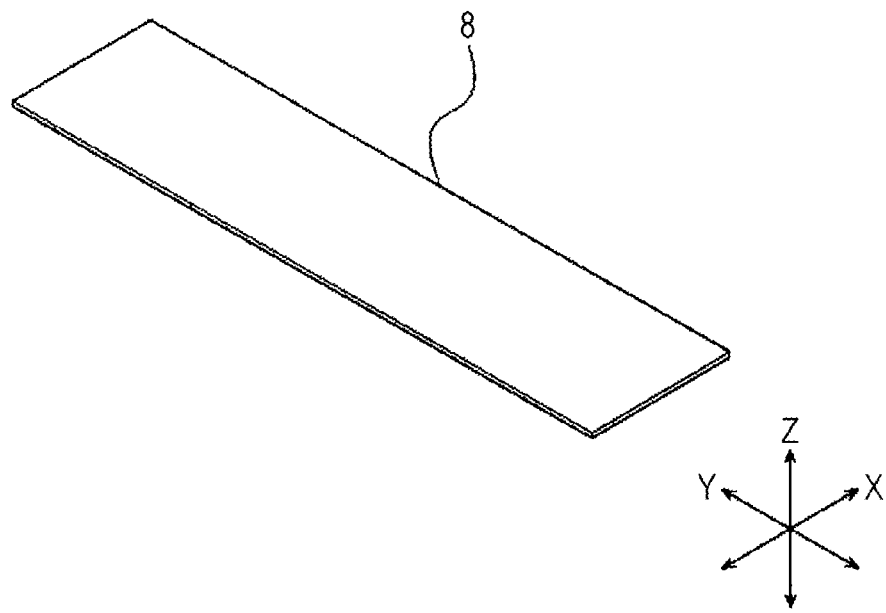
FIG. 11 is a perspective view of an insulating plate.

The insulation plate has an insulation property, and has a shape which allows the insulation plate to be inserted between the first member 55 and the second member 56. As shown in FIG. 11, an insulation plate 8 of this embodiment is a plate-like member.

Figure 12:
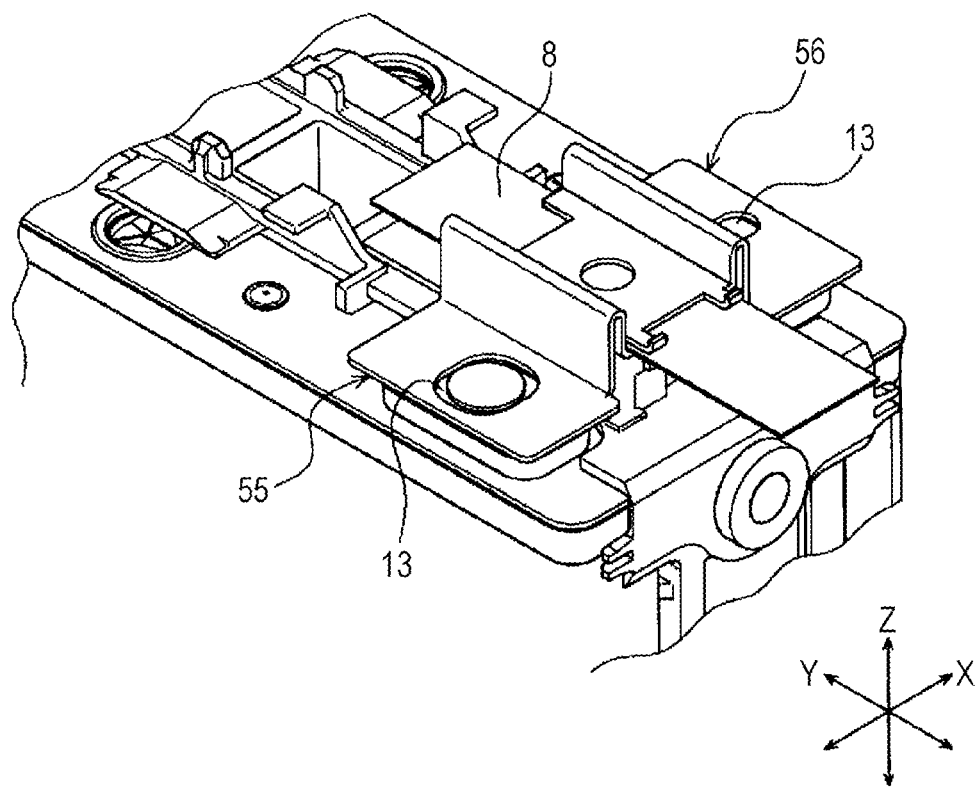
FIG. 12 is an enlarged perspective view of the first bus bar and the surrounding of the first bus bar in a state where the insulating plate is inserted between a first member and a second member in a state where a mounting member and a third member are removed.
Figure 13:
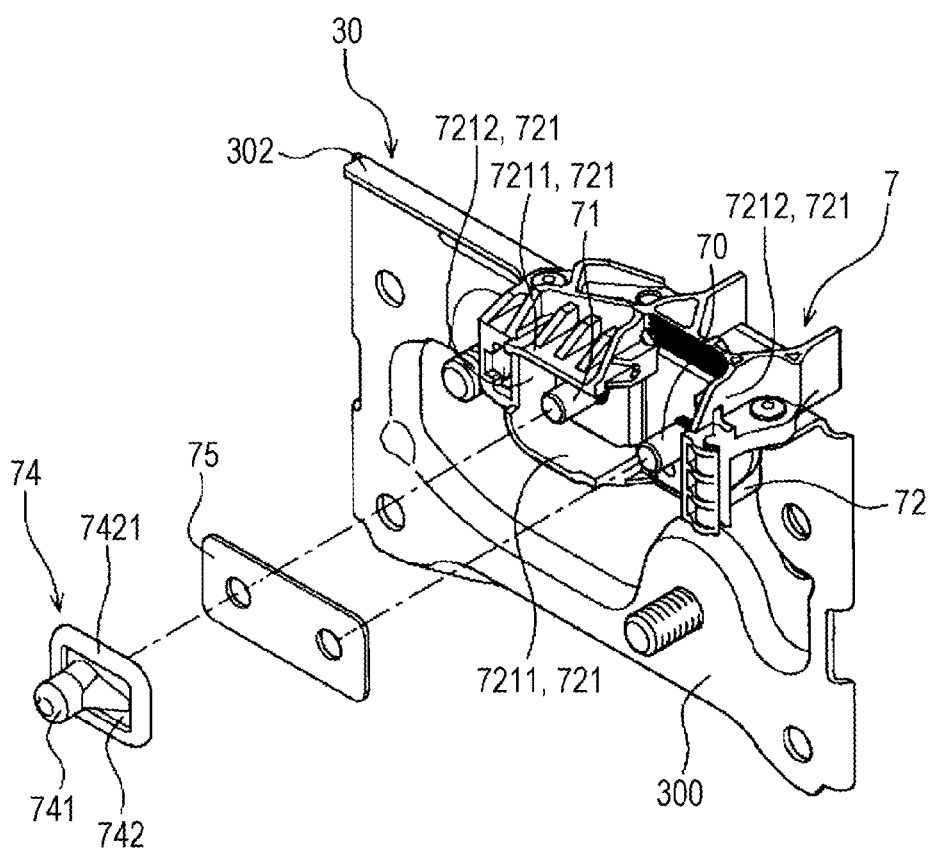
FIG. 13 is an exploded perspective view of a terminal base and the surrounding of the terminal base of an energy storage apparatus according to another embodiment.

As shown in FIG. 12, the insulation plate 8 is inserted between the first member 55 and the second member 56 in a state where the mounting member 6 and the third member 57 are removed. With such a configuration, an electric path which connects the pair of overall terminals 70 to each other is interrupted not only at the position between the overall terminal 70 and the overall electrode 71 but also at the position of the first bus bar 51, and the energy storage apparatus 1 is brought into a state where inputting and outputting of electricity into and from the pair of overall terminals 70 cannot be performed.

On the other hand, when the energy storage apparatus 1 is used, the overall terminal 70 and the overall electrode 71 are electrically connected with each other using the post-assembling bus bar 75. Further, when the energy storage apparatus 1 is used, the insulation plate 8 is pulled out, and the male threaded portion 61 of the mounting member 6 is threadedly engaged with the fixing portion 2113 of the bus bar support portion 2112 in a state where the third member 57 is overlapped to the first member 55 and the second member 56 (see FIG. 5). With such a configuration, the first member 55 and the second member 56 are made conductive with each other, and the energy storage apparatus 1 is brought into a state where inputting and outputting of electricity into and from the pair of overall terminals 70 can be performed.

In the above-mentioned embodiment, the energy storage apparatus 1 is switched between a state where inputting and outputting of electricity into and from the overall terminal 70 can be performed and a state where inputting and outputting of electricity into and from the overall terminal 70 cannot be performed by mounting and removing the post-assembling bus bar 75 on and from the overall terminal 70 and the overall electrode 71 and by connecting and separating the first member 55 and the second member 56 of the first bus bar 51 to and from each other. However, the energy storage apparatus 1 may adopt the configuration other than the above-mentioned configuration. The first bus bar 51 may not be formed of a plurality of separable members but may be formed of a single member. Further, when a bus bar is formed of a plurality of connectable and separable members, the bus bar may be formed of a bus bar other than the first bus bar 51. For example, in the energy storage apparatus 1, the end portion bus bar 53 may include a plurality of members, and the energy storage apparatus 1 may be configured to be switchable between a state where inputting and outputting of electricity into and from the overall terminal 70 can be performed and a state where inputting and outputting of electricity into and from the overall terminal 70 cannot be performed due to connection and separation of these plurality of members.

Figure 14:
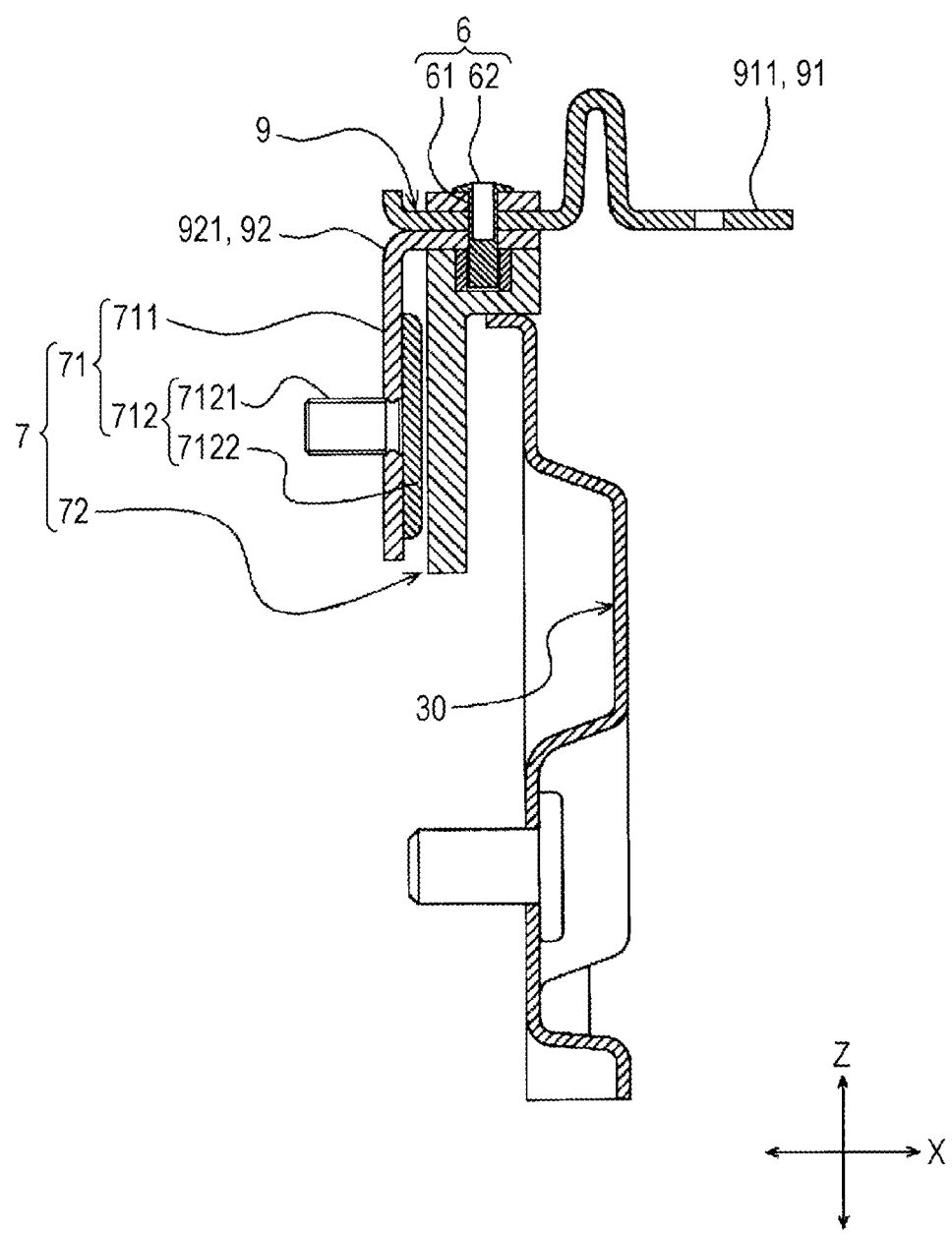
FIG. 14 is an enlarged cross-sectional view of the terminal base and the surrounding of the terminal base.

To be more specific, as shown in FIG. 14, the end portion bus bar 9 may include: a first member 91 having a first connecting portion 911 connected to the external terminal 13; and a second member 92 having a second connecting portion 921 connected to the overall electrode 71, and the first connecting portion 911 and the second connecting portion 921 may be connected to each other thus forming a conductive path from the external terminal 13 to the overall electrode 71. In this case, the energy storage apparatus 1 of this embodiment may be configured to be switchable between a state where inputting and outputting of electricity into and from the overall terminal 70 can be performed and a state where inputting and outputting of electricity into and from the overall terminal 70 cannot be performed due to the insertion and the removal of the insulating plate 8 into and from between the first connecting portion 911 and the second connecting portion 921.

The energy storage apparatus of this embodiment can be also realized by adding the configuration of another embodiment to the configuration of one embodiment, for example. The energy storage apparatus of this embodiment can be realized by replacing a part of the configuration of one embodiment with the configuration of another embodiment. Further, the energy storage apparatus of this embodiment can be realized by omitting a part of the configuration of one embodiment.

What is claimed is:

1. An energy storage apparatus, comprising:
   a plurality of energy storage devices stacked in a first direction;
   a pair of terminal members disposed on opposing sides of the plurality of energy storage devices, in the first direction, the plurality of energy storage devices being disposed between the pair of terminal members;
   an overall electrode to which electricity is supplied from the plurality of energy storage devices;
   an overall terminal which is electrically terminated from the overall electrode and is electrically connected to the overall electrode by a conductive member; and
   a cover member which is removable and covers the overall electrode,
   wherein each of the plurality of energy storage devices includes an external terminal that protrudes from the each of the plurality of energy storage devices in a second direction orthogonal to the first direction,
   wherein the overall electrode and the overall terminal protrude from one of the pair of terminal members, and
   wherein the overall electrode and the overall terminal are bolt-shaped and protrude outwardly along the first direction.

2. The energy storage apparatus according to claim 1, wherein the conductive member is detachably mounted on the overall electrode and the overall terminal, and
   wherein the energy storage apparatus is switchable between a first state where the overall electrode and the overall terminal are electrically connected with each other by the conductive member and a second state where the overall electrode and the overall terminal are not electrically connected with each other.

3. The energy storage apparatus according to claim 1, wherein the overall electrode and the overall terminal protrude from the one of the pair of terminal members in an opposite direction to a direction that the one of the pair of terminal members covers the plurality of energy storage devices.

4. The energy storage apparatus according to claim 1, further comprising a base portion disposed between the one of the pair of terminal members and the conductive member.

5. The energy storage apparatus according to claim 4, wherein the overall electrode comprises:
   a plate-like member attached to the base portion;
   a head portion attached to the plate-like member; and
   a threaded portion attached to the head portion and protruding from the plate-like member.

6. The energy storage apparatus according to claim 5, wherein the head portion is disposed between the base portion and the plate-like member, and
   wherein the threaded portion protrudes from the plate-like member in an opposite direction to a direction that the one of the pair of terminal members covers the plurality of energy storage devices.

7. The energy storage apparatus according to claim 5, wherein the base portion includes first side wall portions which opposedly face each other such that the threaded portion and the overall terminal are positioned between the first side wall portions,
   wherein the base portion further includes second side wall portions which opposedly face each other and are disposed between the first side wall portions, and
   wherein the threaded portion and the overall terminal are positioned between the second side wall portions.

8. The energy storage apparatus according to claim 1, wherein, in a direction that the one of the pair of terminal members covers the plurality of energy storage devices, the cover member is disposed between a cover, which covers the overall electrode covered by the cover member, and the one of the pair of terminal members.

9. The energy storage apparatus according to claim 1, wherein the cover member covers the overall electrode in a direction that the one of the pair of terminal members covers the plurality of energy storage devices.

10. The energy storage apparatus according to claim 1, wherein the electricity is not outputted from the overall terminal when the energy storage apparatus is not used.

11. The energy storage apparatus according to claim 1, wherein each of the plurality of energy storage devices is disposed between the pair of terminal members.

12. An energy storage apparatus, comprising:
    a plurality of energy storage devices stacked in a first direction;
    a pair of terminal members disposed on opposing ends of the plurality of energy storage devices, in the first direction, the plurality of energy storage devices being disposed between the pair of terminal members;
    an overall electrode to which electricity is supplied from the plurality of energy storage devices;
    an overall terminal which is electrically terminated from the overall electrode and is electrically connected to the overall electrode by a conductive member; and
    a cover member which covers the overall electrode,
    wherein each of the plurality of energy storage devices includes an external terminal that protrudes from the each of the plurality of energy storage devices in a second direction orthogonal to the first direction,
    wherein the overall electrode and the overall terminal protrude from one of the pair of terminal members, and
    wherein the overall electrode and the overall terminal are directly connected to the conductive member.

13. The energy storage apparatus according to claim 12, further comprising a cover that covers the overall electrode in a direction that the one of the pair of terminal members covers the plurality of energy storage devices,
    wherein the cover includes an insulating material.

14. The energy storage apparatus according to claim 1, further comprising a base portion disposed between the one of the pair of terminal members and the overall terminal,
    wherein the overall electrode comprises:
    a plate-like member attached to the base portion;
    a head portion attached to the plate-like member; and a threaded portion attached to the head portion and protruding from the plate-like member.

15. The energy storage apparatus according to claim 14, wherein the head portion is disposed between the base portion and the plate-like member, and
wherein the threaded portion protrudes from the plate-like member in an opposite direction to a direction that the one of the pair of terminal members covers the plurality of energy storage devices.

16. The energy storage apparatus according to claim 14, wherein the base portion includes first side wall portions which opposedly face each other such that the threaded portion and the overall terminal are positioned between the first side wall portions,
wherein the base portion further includes second side wall portions which opposedly face each other and are disposed between the first side wall portions, and
wherein the threaded portion and the overall terminal are positioned between the second side wall portions.

17. The energy storage apparatus according to claim 1, wherein the conductive member includes a plate-shaped bus bar.

18. An energy storage apparatus, comprising:
a plurality of energy storage devices stacked in a first direction;
a pair of terminal members disposed on opposing sides of the plurality of energy storage devices, in the first direction, the plurality of energy storage devices being disposed between the pair of terminal members;
an overall electrode to which electricity is supplied from the plurality of energy storage devices;
an overall terminal which is electrically terminated from the overall electrode and is electrically connected to the overall electrode by a conductive member; and
a cover member which is removable and covers the overall electrode,
wherein each of the plurality of energy storage devices includes an external terminal that protrudes from the each of the plurality of energy storage devices in a second direction orthogonal to the first direction,
wherein the overall electrode and the overall terminal protrude from one of the pair of terminal members,
wherein at least one of the overall electrode and the overall terminal is bolt-shaped and protrudes outwardly along the first direction,
wherein the conductive member includes a plate-shaped bus bar, and
wherein the bus bar includes a through hole, at least one of the overall electrode and the overall terminal passing through the through hole.

19. The energy storage apparatus according to claim 18, wherein the bus bar is arranged over the overall electrode and the overall terminal and from an outside of the first direction.

20. The energy storage apparatus according to claim 12, wherein the terminal base includes a side wall extending in the first direction.

* * * * *